Sept. 8, 1964
R. N. GREEN
3,147,625
HYDRAULIC ACCELEROMETER
Filed Nov. 9, 1961
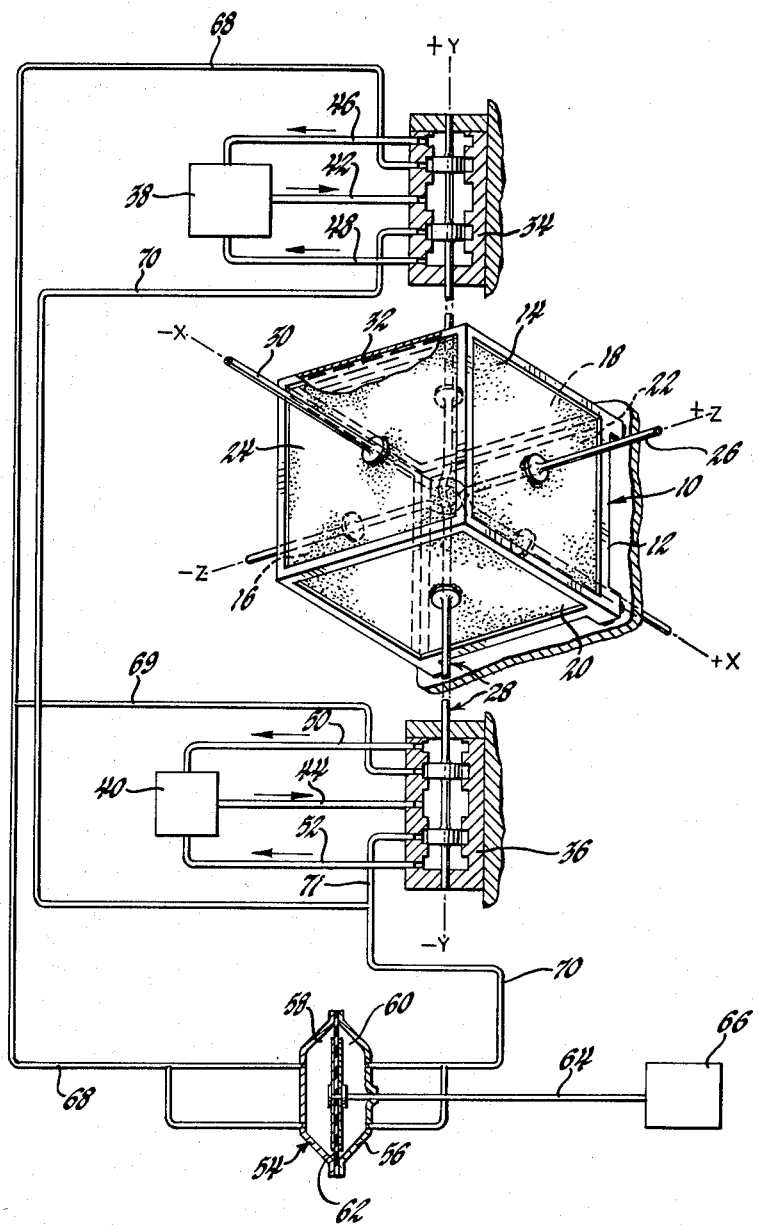
INVENTOR.
Robert N. Green
BY
Paul J. Ethington
ATTORNEY

3,147,625
HYDRAULIC ACCELEROMETER

Robert N. Green, Wauwatosa, Wis., assignor to General Motors Corporation, Detroit, Mich., a corporation of Delaware
Filed Nov. 9, 1961, Ser. No. 151,282
4 Claims. (Cl. 73—515)

This invention relates to accelerometers and more particularly to an improved liquid filled accelerometer.

One form of liquid filled accelerometer in the prior art comprises a cube shaped container filled with a high density liquid and having pressure responsive transducers mounted on the walls thereof. When the container is accelerated, the fluid, due to the natural inertia of its mass, will exert force components on the walls of the container in a direction opposite from that of the direction of acceleration. The pressure responsive transducers are responsive to the force components and provide electrical output signals proportional to the acceleration. However, accelerometers constructed as described do not provide for "oil canning" effects, i.e. when the container is accelerated, the walls parallel to the direction of acceleration are acted upon by variations in force components normal to the direction of acceleration along the length of the walls. These force components will be of greater magnitude near the wall which is directly acted upon by the force components parallel to the direction of acceleration and, hence, erroneous output signals may be obtained from the pressure responsive transducers. In addition, the pressure responsive transducers utilized in such accelerometers provide electrical output signals as a measure of acceleration which in certain environments may be undesirable.

In accordance with the present invention, a liquid filled accelerometer is provided wherein "oil canning" is minimized or eliminated and which does not utilize pressure transducers having electrical output signals. This is accomplished by connecting opposing flexible walls of a closed rectangular shape container with rigid means such as tie-rods, thereby maintaining constant displacement between opposing walls so that the walls normal to the direction of acceleration flex together, whereas the displacement between walls parallel to the direction of acceleration is maintained constant with variations in force components acting on the walls. The extent of deflection of the walls may be used as a measure of acceleration. Accordingly, the accelerometer provides a measure of acceleration which does not reflect the effect of "oil canning."

A more complete understanding of this invention may be had from the detailed description which follows, taken with the accompanying drawing in which the figure shown is a perspective view of one embodiment of the invention.

Referring now to the drawing, a cubical shaped container 10 is provided having a cubical shaped frame 12 supporting six walls 14, 16, 18, 20, 22 and 24, preferably constructed of membranes of flexible material, such as neoprene. The opposing walls of the container are connected in a push-pull manner at their centers with rigid tie-rods, i.e. the walls 14 and 16 are connected at their centers with a rigid tie-rod 26, the walls 18 and 20 are connected at their centers with a rigid tie-rod 28, and the walls 22 and 24 are connected at their centers with a rigid tie-rod 30. The rods may be secured to the walls with any suitable securing means, such as cement. The rods 30, 28 and 26 respectively define three mutually perpendicular axes X, Y and Z. The rods are bent midway between the opposing walls, as is seen in the accompanying figure, so as to prevent contact between the rods when axially moved. The container 10 is filled with an acceleration responsive fluid, such as silicone liquid 32.

When the container 10 is accelerated, the fluid 32, due to the natural inertia of its mass, will exert force components on the walls of the container 10 in a direction opposite from that of the direction of acceleration. The wall of the container 10 which is normal to and acted on by the force components will flex in accordance therewith, pulling the opposing wall by means of the interconnecting rod in the same direction as the force components. The extent of the deflection of the wall may be measured and with the knowledge of the flexure characteristics of the membranes used for the walls provides a measure of acceleration of the container. The walls parallel to the direction of acceleration will not distend at their centers due to variations in force components acting on the walls, inasmuch as the rigid tie-rods maintain constant displacement between the centers of opposing walls. For example, if the container 10 is accelerated in a +Y direction, the fluid 32 will exert force components in the —Y direction normal to the wall 20 which will flex, thereby pulling the wall 18 in the —Y direction. In addition to exerting force components on the wall 20, the liquid 32 will tend to provide an "oil canning" effect due to the variable force components acting on the walls 14, 16, 22 and 24 which will tend to distend. However, the rigid tie-rods 26 and 30 maintain a constant displacement between the respective pairs of opposing walls 14 and 16, and 22 and 24 thereby cancelling out any "oil canning" effects.

A servo control system such as that shown in the drawing may be utilized to provide a control function in accordance with the flexure of the walls. For illustrative purposes, a servo control system is shown only in conjunction with the Y—Y axis. It is to be understood that similar systems are to be used in conjunctions in the X—X and Z—Z axes to obtain a three-axis accelerometer. The rod 28 is extended beyond the walls 18 and 20 and provided with spool valves 34 and 36 mounted at each end. The fluid pressure supply 38 supplies fluid pressure to the servo spool valve 34 via the conduit 42 coupled therebetween, and the fluid pressure supply 40 supplies fluid pressure to the servo spool valve 36 via the conduit 44 coupled therebetween. Conduits 46 and 48 coupled between the supply 38 and the valve 34, and conduits 50 52 coupled between the supply 40 and the valve 36 provide return paths for the fluid pressure. A motor 54 having a steel casing 56 is provided with chambers 58 and 60, separated with a flexible diaphragm 62. An axially movable rod 64 is rigidly secured to the center of the diaphragm 62 and operative to actuate a control device such as a rudder 66 in accordance with the flexure of the diaphragm 62. Load lines 68 and 70 couple the spool valve 34 with the chambers 58 and 60, respectively, of the motor 54. Load lines 69 and 71 couple the valve 36 with the load lines 68 and 70, respectively.

When the container 10 is accelerated in the +Y direction, the fluid 32 will exert force components in the —Y direction normal to the wall 20. The wall 20 and hence the rod 28 will be displaced in the —Y direction permitting increased fluid pressure flow in the load lines 70 and 71, and a decreased fluid pressure flow in the load lines 68 and 69 thereby providing a greater fluid pressure in the chamber 60 than in the chamber 58. The diaphragm 62 will be displaced toward the left with a resulting leftward axial movement of the rod 64 thereby actuating the rudder 66. Likewise, if the container 10 is accelerated in the —Y direction, it is seen that the rod 64 will be displaced toward the right, actuating the rudder 66 in accordance therewith.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. An accelerometer comprising a closed rectangular shaped container filled with liquid, the container having a rigid frame and at least two pairs of oppositely disposed walls constructed of flexible material, the walls of each pair of walls being deflected in response to force components normal to the walls when the container is accelerated, substantially non-extensible means connecting the walls of each pair of walls so that the walls normal to the direction of acceleration flex together in the same direction and the displacement between the walls of the pair of walls parallel to the direction of acceleration is maintained constant, and means for measuring the deflection of the walls normal to the acceleration so as to provide an indication of the acceleration of the container.

2. An accelerometer comprising a closed rectangular shaped container having a rigid frame and flexible walls, the container being filled with liquid, the walls being deflected in response to force components exerted thereon due to the inertia of the liquid when the container is accelerated, substantially non-extensible means connecting the opposing walls so as to permit the walls normal to the acceleration to flex together and to maintain constant displacement between the walls parallel to the acceleration, and means for measuring the deflection of the walls normal to the direction of acceleration so as to provide an indication of the acceleration of the container.

3. An accelerometer for measuring acceleration along three mutually perpendicular axes and comprising a cubical container having a rigid frame and flexible walls, the container being filled with an acceleration responsive liquid, the walls being deflected in response to force components exerted thereon by the liquid when the container is accelerated, rigid rods connecting opposing walls so that the walls normal to the direction of acceleration flex together in the same direction and the distance between the walls parallel to the direction of acceleration is maintained constant, and a fluid pressure pick off device coupled with each rod and adapted to develop a fluid pressure in accordance with the deflection of the walls connected with each rod.

4. An accelerometer comprising a closed cubical shaped container filled with liquid, the container having a rigid frame and walls made of membranes of flexible material, the walls being deflected in response to force components acting on the walls due to the inertia of the liquid when the container is accelerated, rigid means connecting the centers of opposing walls so as to permit the walls normal to the direction of acceleration to flex together in the same direction and to prevent the walls parallel to the direction of acceleration from being distended at their centers, and means for measuring the deflection of the walls normal to the direction of acceleration so as to provide an indication of the acceleration of the container.

References Cited in the file of this patent

UNITED STATES PATENTS

| | | |
|---|---|---|
| 2,183,002 | Bach | Dec. 12, 1939 |
| 2,728,868 | Peterson | Dec. 27, 1955 |

FOREIGN PATENTS

| | | |
|---|---|---|
| 405,560 | Italy | Aug. 19, 1943 |